(12) United States Patent
Umeya

(10) Patent No.: US 7,787,080 B2
(45) Date of Patent: Aug. 31, 2010

(54) REFLECTING ELEMENT AND PROJECTION SYSTEM COMPRISING THE SAME

(75) Inventor: Masanori Umeya, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1263 days.

(21) Appl. No.: 11/332,141

(22) Filed: Jan. 17, 2006

(65) Prior Publication Data

US 2006/0171030 A1    Aug. 3, 2006

(30) Foreign Application Priority Data

Jan. 28, 2005    (JP)    ............................. 2005-021422

(51) Int. Cl.
*G02F 1/1335*    (2006.01)
(52) U.S. Cl. ............................. 349/115; 349/5; 349/6; 349/7; 349/8; 349/9; 349/98; 353/20
(58) Field of Classification Search ............... 349/5, 349/8, 9, 115; 353/37, 20
See application file for complete search history.

(56) References Cited

U.S. PATENT DOCUMENTS 5,466,950 A * 11/1995 Sugawara et al. ............. 257/94
5,541,745 A * 7/1996 Fergason ..................... 349/194
5,734,447 A * 3/1998 Loiseaux et al. ............... 349/5
2005/0122582 A1* 6/2005 Umeya ........................ 359/449

FOREIGN PATENT DOCUMENTS

JP    A 05-107660    4/1993
JP    A 2000-221449    8/2000

* cited by examiner

*Primary Examiner*—David Nelms
*Assistant Examiner*—Thanh-Nhan P Nguyen
(74) *Attorney, Agent, or Firm*—Oliff & Berridge, PLC

(57) ABSTRACT

A projection system includes a projector that emits imaging light, a polarization screen that selectively reflects, of the imaging light, only light in a specified state of polarization, and a reflecting element placed on an optical path between the projector and the polarization screen to reflect the imaging light. The projector emits imaging light containing circularly polarized light whose state of polarization varies according to the wave range of the light, and the first and the second reflective layers in the reflecting element have polarization characteristics and reflection wave ranges corresponding to the state of polarization and the wave range of the circularly polarized light contained in the imaging light in such a manner that the state of polarization of the circularly polarized light, after being reflected from the first and the second reflective layers, is uniform irrespective of the wave range of the light.

9 Claims, 8 Drawing Sheets

REFLECTING ELEMENT AND PROJECTION SYSTEM COMPRISING THE SAME

BACKGROUND OF THE INVENTION

1. Field of the Invention

The present invention relates to a projection system in which imaging light emitted from a projector is projected on a projection screen to display thereon an image. More particularly, the present invention relates to a reflecting element that serves as a polarizer for changing the state of polarization of imaging light that is emitted from a projector, and to a projection system comprising the reflecting element.

2. Background Art

Conventional projection systems are usually as follows: imaging light emitted from a projector is projected on a projection screen, and viewers observe the light reflected from the projection screen as an image.

Typical examples of reflective projection screens for use in such conventional projection systems include white-colored paper or cloth materials, and plastic films coated with ink that scatters white light. Besides, higher-quality projection screens that comprise, so as to control scattering of imaging light, scattering layers containing beads, pearlescent pigments, or the like are now commercially available. All of these projection screens have no selectivity of polarization, so that, in projection systems comprising these projection screens, there has been no need to control the state of polarization of imaging light.

On the other hand, polarization screens using polarizers or polarized-light-separating elements are known as projection screens of a type different from the above-described ones (see Japanese Laid-Open Patent Publication No. 107660/1993). Such polarization screens have polarization selectivity with which they selectively reflect only light in a specified state of polarization. It is, therefore, possible to obtain excellent image quality (especially, contrast) even under bright environmental light if the state of polarization of imaging light is controlled so that the imaging light can be distinguished, by the state of polarization of the light, from external light such as interior illumination light.

Incidentally, in the case where a projector using a CRT (cathode ray tube) or DMD (digital micromirror device), for example, is used in a projection system comprising a polarization screen of the above-described type, since imaging light emitted from the CRT or DMD is unpolarized, it is necessary to place a polarization-controlling element, such as a polarizer for controlling the state of polarization of the imaging light, either in the vicinity of the aperture of the projector or on the optical path between the projector and the polarization screen, thereby converting the unpolarized imaging light into polarized one in a specified state of polarization. However, if a polarization-controlling element such as a polarizer is thus placed, unwanted polarized light is absorbed by the polarization-controlling element and is not used as imaging light. Therefore, the use of a polarization-controlling element has been disadvantageous in that the projector cannot exhibit its true performance and that the brightness of the imaging light is reduced to half.

On the other hand, when a liquid crystal projector is used as the projector, since it emits linearly polarized light under normal conditions, there can be used a polarization screen as it is if the polarization screen is of a type that reflects linearly polarized light. Further, even when a polarization screen of a type that reflects circularly polarized light or the like is used, it is possible to project, on the polarization screen, imaging light in the desired state of polarization without reducing the brightness of the imaging light if a quarter wave plate or the like is used.

However, when a liquid crystal projector is used as the projector, although the above-described reduction in the brightness of imaging light is not caused, the following problem occurs. Namely, in most commercially available liquid crystal projectors, the axes of polarization of light beams (linearly polarized light beams) in the respective wave ranges for the three primary colors (red (R), green (G), and blue (B)) making up imaging light are not identical (see Japanese Laid-Open Patent Publication No. 221449/2000), so that these projectors cannot be used as they are in projection systems comprising conventional polarization screens that reflect linearly polarized light beams whose axes of polarization are the same in all of the wave ranges. In projection systems comprising polarization screens that reflect circularly polarized light, linearly polarized light is used after converting it into circularly polarized light. Even in these projection systems, since the state of polarization of the linearly polarized light before conversion is not uniform, it is difficult to make the direction of optical rotation of the circularly polarized light after conversion (right-handed circularly polarized light and left-handed circularly polarized light) uniform.

SUMMARY OF THE INVENTION

The present invention was accomplished in the light of the above-described problems in the prior art. An object of the present invention is, therefore, to provide a reflecting element for use in a projection system comprising a polarization screen, capable of converting the state of polarization of imaging light emitted from a projector into the desired one without reducing the brightness of the imaging light, and of making image contrast high even under bright environmental light; and a projection system comprising the reflecting element.

The present invention provides, as a first means of fulfilling the above-described object, a reflecting element comprising a first reflective layer that selectively reflects only light in a specified wave range and transmits light in the other wave ranges, and a second reflective layer that reflects light in another wave range covering at least one wave range other than the specified wave range of the light reflected by the first reflective layer, either the first or the second reflective layer being a polarization-maintaining reflective layer that reflects circularly polarized light while maintaining the state of polarization of the circularly polarized light, the other reflective layer being a polarization-reversing reflective layer that reflects circularly polarized light while reversing the state of polarization of the circularly polarized light.

In the above-described first means of fulfilling the object of the invention, the first and the second reflective layers are preferably specular reflective layers that specularly reflect circularly polarized light.

Further, in the above-described first means of fulfilling the object of the invention, the first reflective layer is preferably a cholesteric reflective layer serving as the polarization-maintaining reflective layer, while the second reflective layer is preferably a metallic or Bragg reflective layer serving as the polarization-reversing reflective layer. Alternatively, the first reflective layer may be a metallic or Bragg reflective layer serving as the polarization-reversing reflective layer, while the second reflective layer may be a cholesteric reflective layer serving as the polarization-maintaining reflective layer.

Furthermore, in the above-described first means of fulfilling the object of the invention, the cholesteric reflective layer is preferably a layer made of a cholesteric liquid crystal polymer.

Furthermore, in the above-described first means of fulfilling the object of the invention, it is preferred that the metallic reflective layer or the Bragg reflective layer be formed as a front surface mirror that reflects light from its surface.

Furthermore, in the above-described first means of fulfilling the object of the invention, it is preferred that the first reflective layer selectively reflects only light in the wave range for a green color, while that the second reflective layer reflects light in another wave range covering at least one wave range other than the wave range for a green color. Alternatively, the first reflective layer may selectively reflect only light in a wave range excluding the wave range for a green color, while the second reflective layer may reflect light in a wave range covering at least the wave range for a green color.

Furthermore, in the above-described first means of fulfilling the object of the invention, it is preferred that the second reflective layer reflects light in the whole visible wave range.

Furthermore, in the above-described first means of fulfilling the object of the invention, the first and the second reflective layers may be laminated with each other via an intermediate layer. In this case, the intermediate layer is preferably an alignment film for aligning a cholesteric liquid crystal polymer.

Furthermore, in the above-described first means of fulfilling the object of the invention, it is preferred that the reflecting element further comprises a quarter wavelength retardation layer that brings, to light incident on the first reflective layer, a phase shift equal to a quarter of the wavelength of the light.

The present invention provides, as a second means of fulfilling the above-described object of the invention, a projection system comprising a projector that emits imaging light, a polarization screen that selectively reflects, of the imaging light emitted from the projector, only light in a specified state of polarization to display an image, and a reflecting element according to the above-described first means (the reflecting element having no quarter wavelength retardation layer) that is placed on an optical path between the projector and the polarization screen to reflect the imaging light emitted from the projector and to project the same onto the polarization screen, wherein the projector emits imaging light containing circularly polarized light whose state of polarization varies according to the wave range of the light, and the first and the second reflective layers in the reflecting element have polarization characteristics and reflection wave ranges corresponding to the state of polarization and the wave range of the circularly polarized light contained in the imaging light emitted from the projector in such a manner that the state of polarization of the circularly polarized light, after being reflected from the first and the second reflective layers, is uniform irrespective of the wave range of the light.

In the above-described second means of fulfilling the object of the invention, it is preferred that the projector comprises a projector body that emits imaging light containing linearly polarized light whose state of polarization varies according to the wave range of the light, and a quarter wave plate that is placed on an optical path between the projector body and the reflecting element to convert the linearly polarized light contained in the imaging light emitted from the projector body into circularly polarized light. In this case, the projector body is preferably a liquid crystal projector.

Further, in the above-described second means of fulfilling the object of the invention, it is preferred that the reflecting element be integrally incorporated in the projector.

Furthermore, in the above-described second means of fulfilling the object of the invention, it is preferred that the projector system further comprises a reflector placed on an optical path between the reflecting element and the polarization screen to reflect the imaging light reflected from the reflecting element and to project the same onto the polarization screen.

The present invention provides, as a third means of fulfilling the above-described object of the invention, a projection system comprising a projector that emits imaging light, a polarization screen that selectively reflects, of the imaging light emitted from the projector, only light in a specified state of polarization to display an image, and a reflecting element according to the above-described first means (the reflecting element having a quarter wavelength retardation layer) that is placed on an optical path between the projector and the polarization screen to reflect the imaging light emitted from the projector and to project the same onto the polarization screen, wherein the projector emits imaging light containing linearly polarized light whose state of polarization varies according to the wave range of the light, the quarter wavelength retardation layer in the reflecting element converts the linearly polarized light contained in the imaging light into circularly polarized light, and the first and the second reflective layers in the reflecting element have polarization characteristics and reflection wave ranges corresponding to the state of polarization and the wave range of the circularly polarized light contained in the imaging light reflected by the reflecting element in such a manner that the state of polarization of the circularly polarized light, after being reflected from the first and the second reflective layers, is uniform irrespective of the wave range of the light. In this case, the projector preferably comprises a liquid crystal projector.

Further, in the above-described third means of fulfilling the object of the invention, it is preferred that the reflecting element be integrally incorporated in the projector.

Furthermore, in the above-described third means of fulfilling the object of the invention, it is preferred that the projector system further comprises a reflector placed on an optical path between the reflecting element and the polarization screen to reflect the imaging light reflected from the reflecting element and to project the same onto the polarization screen.

According to the present invention, the reflecting element comprising the first reflective layer that selectively reflects only circularly polarized light in a specified wave range and transmits circularly polarized light not in the specified wave range, and the second reflective layer that reflects light in a wave range covering at least one wave range other than the specified wave range of the circularly polarized light reflected by the first reflective layer is provided as a reflecting element for reflecting imaging light emitted from a projector to project it onto a polarization screen, whereby the circularly polarized light beams in both the specified wave range and the wave range other than the specified wave range are reflected from the first and the second reflective layers. For this reason, it is possible to convert the state of polarization of the imaging light emitted from the projector into a state of polarization, light in which state of polarization the polarization screen selectively reflects, while scarcely reducing the brightness of the imaging light (the amount of light). The polarization screen can, therefore, reflect imaging light more efficiently than external light such as interior illumination light to display an image with high contrast even under bright environmental light.

In addition, according to the present invention, either the first or the second reflective layer reflects circularly polarized light while maintaining the state of polarization of the circularly polarized light, and the other reflective layer reflects circularly polarized light while reversing the state of polarization of the circularly polarized light, so that the state of polarization of the imaging light, after being reflected from the first and the second reflective layers in the reflecting element, is uniform in all of the wave ranges. For this reason, even when a commercially available liquid crystal projector (a liquid crystal projector of three plate type that emits a linearly polarized light beam in the wave range for a green color (G), having a specified axis of polarization, and linearly polarized light beams in the wave ranges for a red color (R) and a blue color (B), having axes of polarization perpendicular to the axis of polarization of the linearly polarized light beam in the wave range for a green color (G)) and a conventional polarization screen that reflects imaging light in one state of polarization irrespective of the wave range of the light are used, it is possible to correctly project an image on the screen.

DETAILED DESCRIPTION OF THE INVENTION

Embodiments of the present invention will be described hereinafter with reference to the accompanying drawings.

First Embodiment

First of all, the entire constitution of a projection system comprising a reflecting element according to the first embodiment of the present invention will be described with reference to FIG. 1.

Figure 1:
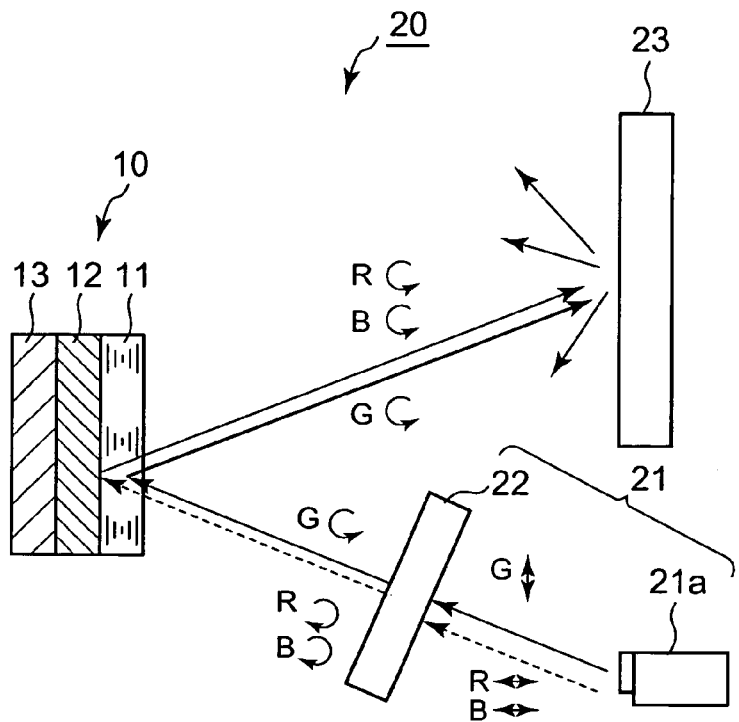
FIG. 1 is a view showing an example of projection system comprising a reflecting element according to the first embodiment of the present invention.

As shown in FIG. 1, a projection system 20 according to the first embodiment of the present invention is a front projection system in which imaging light is projected from the front side, and comprises a projector 21 that emits imaging light, a reflective polarization screen 23 that selectively reflects, of the imaging light emitted from the projector 21, only light in a specified state of polarization to display an image, and a reflecting element 10 that is placed on the optical path between the projector 21 and the reflective polarization screen 23 to reflect the imaging light emitted from the projector 21 and to project the same onto the reflective polarization screen 23.

The projector 21 emits imaging light containing circularly polarized light whose state of polarization varies according to the wave range of the light, and comprises a liquid crystal projector (projector body) 21a and a quarter wave plate 22 that is placed on the optical path between the liquid crystal projector 21a and the reflecting element 10. As shown in FIG. 1, the quarter wave plate 22 is placed at such a location that only the imaging light emitted from the liquid crystal projector 21a in the projector 21 passes through the quarter wave plate 22, and that the imaging light reflected from the reflecting element 10 does not pass again through the quarter wave plate 22.

The liquid crystal projector 21a emits imaging light containing linearly polarized light whose state of polarization varies according to the wave range of the light. Namely, in a general liquid crystal projector, ON and OFF are switched by respective liquid crystal cells corresponding to respective wave ranges for the three primary colors (red (R), green (G), and blue (B)), which constitute imaging light, so that the axes of polarization of linearly polarized light beams in the respective wave ranges for the red (R), the green (G), and the blue (B) are not necessarily identical. In the light of this fact, in the present embodiment, like imaging light emitted from a commercially available general liquid crystal projector (a liquid crystal projector of three-plate type), the imaging light emitted from the liquid crystal projector 21a contains a linearly polarized light beam in the wave range for the green color (G), having a specified axis of polarization, and linearly polarized light beams in the wave ranges for the red color (R) and the blue color (B), having axes of polarization perpendicular to the specified axis of polarization of the linearly polarized light beam in the wave range for the green color (G).

The quarter wave plate 22 converts the linearly polarized light contained in the imaging light emitted from the liquid crystal projector 21a into circularly polarized light. When two linearly polarized light beams, whose axes of polarization are at right angles to each other, pass through the quarter wave plate 22, one of them becomes right-handed circularly polarized light, and the other becomes left-handed circularly polarized light. In principle, when the angle between the slow axis of the quarter wave plate 22 and the axis of polarization of a linearly polarized light beam is 45°, the linearly polarized light beam is converted into circularly polarized light. Therefore, the imaging light finally emitted from the projector 21 toward the reflecting element 10 contains circularly polarized light, whose state of polarization varies according to the wave range of the light (e.g., left-handed circularly polarized light in the wave range for the green color (G), and right-handed circularly polarized light in the wave ranges for the red color (R) and the blue coor (B)). Since the quarter wave plate 22 is required to have each phase shift that matches each wavelength of the light beams in the respective wave ranges for the three primary colors (red (R), green (G), and blue (B)) constituting imaging light, it is preferred that the quarter wave plate 22 comprises a wide-wave-range quarter wavelength retardation layer. For such a wide-wave-range quarter wavelength retardation layer can be used a combination of a half wavelength retardation layer and a quarter wavelength retardation layer, a combination of materials having different refractive indexes, a material having characteristics suitable for a wide-wave-range retardation layer, or the like. The wide-wave-range quarter wavelength retardation layer may be in the shape of a plate, a film, or the like. Specifically, a retardation layer for use in a circular polarizer can be herein used as it is, for example. In a case wherein a wide-wave-range quarter wavelength retardation layer is used for the quarter wave plate 22, since the elliptical electric vector of the circularly polarized light converted from the linearly polarized light becomes nearly perfectly circular, the conversion of the polarized light can be controlled by the reflecting element 10 with higher certainty.

Next, the reflective polarization screen 23 will be described below.

The reflective polarization screen 23 selectively reflects, of the imaging light emitted from the projector 21, only light in a specified state of polarization. For the reflective polarization screen 23 can be used an absorptive polarizing layer, a polarization screen using a linearly-polarized-light-separating layer composed of a multi-layer film such as DBEF, a polarization screen using a circularly-polarized-light-separating layer composed of cholesteric liquid crystals, or the like. In this embodiment, since the imaging light that has been reflected from the reflecting element 10 and is projected on the reflective polarization screen 23 contains circularly polarized light, it is preferable to use, as the reflective polarization screen 23, a polarization screen using a circularly-polarized-light-separating layer composed of cholesteric liquid crystals, or the like. The reflective polarization screen 23 herein selectively reflects circularly polarized light in one state of polarization (e.g., left-handed circularly polarized light) in all of the wave ranges for the three primary colors (red (R), green (G), and blue (B)) constituting imaging light.

Next, the reflecting element 10 will be described.

The reflecting element 10 comprises a cholesteric reflective layer 11 as a first reflective layer situated on the side on which imaging light is incident, and a metallic reflective layer 12 as a second reflective layer situated on the opposite side (back side) to the side on which imaging light is incident. The cholesteric reflective layer 11 and the metallic reflective layer 12 are laminated onto a substrate 13.

Figure 2:
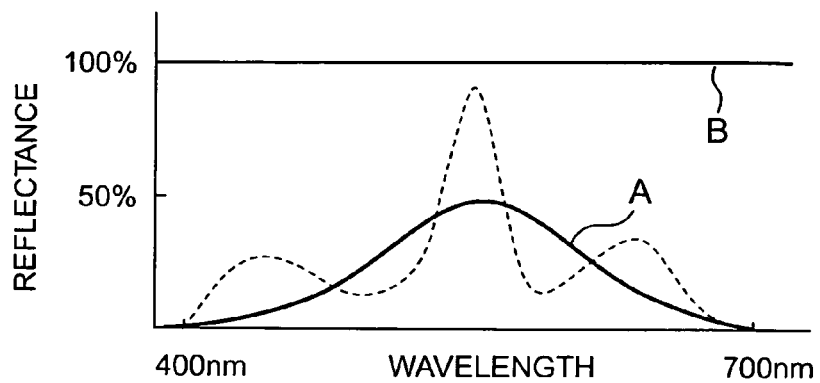
FIG. 2 is a diagram showing an example of reflection characteristics of the reflecting element used in the projection system shown in FIG. 1.

Of these two reflective layers, the cholesteric reflective layer 11 is a thin layer made of a cholesteric liquid crystal polymer obtained by polymerizing cholesteric liquid crystals, and is designed in such a manner that it selectively reflects only circularly polarized light in a specified wave range and transmits circularly polarized light not in the specified wave range. Specifically, for example, the cholesteric reflective layer 11 is designed in such a manner that it selectively reflects only light in the wave range for the green color (G), as shown in FIG. 2 (see reference character A). The cholesteric reflective layer 11 functions as a layer that reflects circularly polarized light while maintaining the state of polarization of the circularly polarized light (referred to as a polarization-maintaining reflective layer). Specifically, for example, assuming that circularly polarized light (e.g., left-handed circularly polarized light) is incident on the cholesteric reflective layer 11, the layer 11 reflects the left-handed circularly polarized light as it is. Since the cholesteric reflective layer 11 reflects circularly polarized light optically rotated in one direction (e.g., left-handed circularly polarized light) only, it is necessary to determine, in advance, the direction of optical rotation of the circularly polarized light contained in the imaging light that is incident on the reflecting element 10 in such a manner that the direction of optical rotation of the circularly polarized light to be reflected from the cholesteric reflective layer 11 matches polarization characteristics of the cholesteric reflective layer 11.

The metallic reflective layer 12 is a layer of a metal selected from a variety of metals, and is designed in such a manner that it reflects light in a wave range covering at least one wave range other than the specified wave range of the light reflected by the cholesteric reflective layer 11. Specifically, for example, the metallic reflective layer 12 is designed in such a manner that it reflects light in the whole visible wave range, as shown in FIG. 2 (see reference character B). The metallic reflective layer 12 functions as a layer that reflects circularly polarized light while reversing the state of polarization of the circularly polarized light (referred to as a polarization-reversing reflective layer). Specifically, for example, assuming that circularly polarized light (e.g., right-handed circularly polarized light) is incident on the metallic reflective layer 12, the layer 12 reflects the right-handed circularly polarized light while converting the same into left-handed circularly polarized light. When linearly polarized light is incident on the metallic reflective layer 12, the above-described phenomenon of reversion of the state of polarization doesn't occur. Whenever a metallic surface reflects circularly polarized light, the state of polarization of the circularly polarized light is reversed. Thus, the metallic reflective layer 12 may be made from any metal. However, since the metallic reflective layer 12 is used for a projection system, it is preferably a white-colored one (i.e., a layer that scarcely causes wavelength-dependent dispersion). Specifically, such a metal as silver, aluminum, or chromium is herein preferably used, for example.

Although the cholesteric reflective layer 11 and the metallic reflective layer 12 in the reflecting element 10 reflect light beams in the wave ranges for the different colors, it is essential that the wavelength-dependent dispersion of the light obtained by synthesizing the light beams that have been finally reflected from the reflecting element 10 be almost the same as that of the light before incidence of the light on the reflecting element 10. Namely, when the liquid crystal projector 21a in the projector 21 is normally white, light reflected from the reflecting element 10 has to be white. The balance of colors is affected by the wave ranges for the respective colors reflected by the reflecting element 10, reflectance for the respective colors, wavelength dispersion of the liquid crystal projector 21a, and so on. Thus, the balance may be properly adjusted with consideration for these factors. Typically, it is preferred that the wave ranges for the blue color (B), for the green color (G) and for the red color (R) be from 400 to 500 nm, from 500 to 570 nm, and from 570 to 800 nm, respectively. Further, it is preferred that light be reflected at the same reflectance irrespective of its color. In this case, the reflection wave range of the cholesteric reflective layer 11 is shifted to the shorter wavelength side according to the angle of incidence of light (referred to as "blue shift"). Therefore, when the reflecting element 10 is placed in such a manner that light is obliquely incident on the reflecting element 10, it is necessary to design the cholesteric reflective layer 11 with consideration for the above-described blue shift.

In addition, in order to maintain the sharpness of the imaging light to be projected on the reflective polarization screen 23, it is preferable to form both the cholesteric reflective layer 11 and the metallic reflective layer 12 in the reflecting element 10 as specular reflective layers that can specularly reflect circularly polarized light. Further, it is preferred that the cholesteric reflective layer 11 and the metallic reflective layer 12 be formed as plane, specular reflective layers with plane mirror surfaces so that they reflect the imaging light in the same direction. Furthermore, it is preferable to form the metallic reflective layer 12 as a front surface mirror that reflects light from its surface (a surface portion with a thickness of several microns). By forming the two reflective layers as described above, it is possible to minimize the difference between the optical path of the imaging light reflected from the metallic reflective layer 12 as the second reflective layer and the optical path of the imaging light reflected from the cholesteric reflective layer 11 as the first reflective layer.

Figure 9:
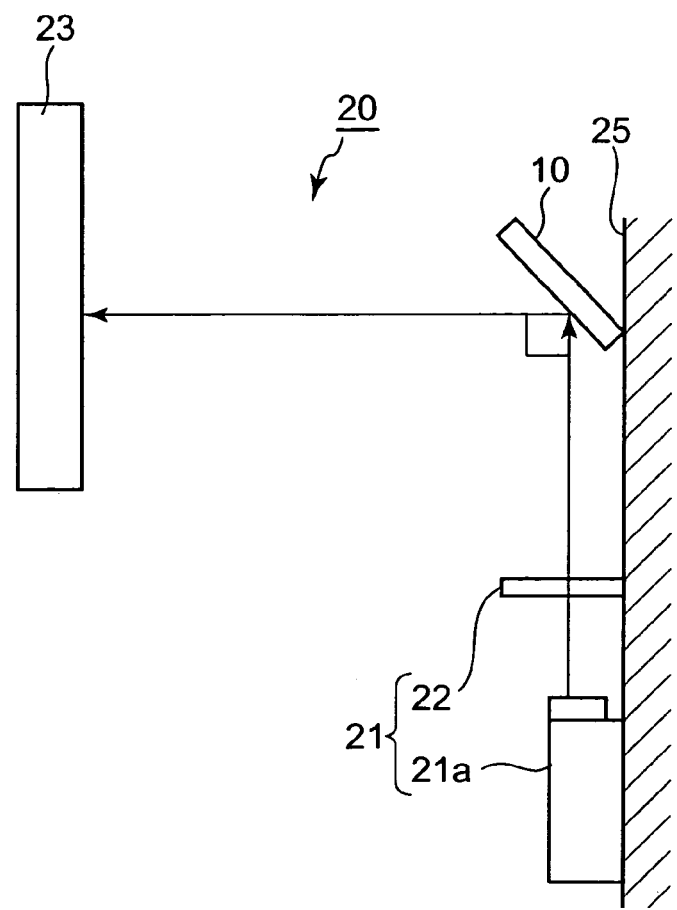
FIG. 9 is a view showing a modification of the projection system shown in FIG. 1, in which the projector is fixed in a modified manner.

In the projection system 20 shown in FIG. 1, the angle at which the imaging light emitted from the projector 21 is incident on the reflecting element 10 may be freely selected, and the projector 21 and the reflecting element 10 may be arranged in any positional relationship. Specifically, for example, if the angle at which the imaging light is incident on the reflecting element 10 may be made great (e.g., 90°), it is possible to attach the projector 21 (the liquid crystal projector 21a and the quarter wave plate 22) to a wall 25 in a manner shown in FIG. 9, instead of placing it on a floor or of hanging it from a ceiling.

In the projection system 20 shown in FIG. 1, it is preferred that illumination light emitted from a light source (not shown in the figure) to illuminate the reflective polarization screen 23 mainly contains polarized light components not reflected by the reflective polarization screen 23. However, the light source is not limited to this type, and an ordinary light source that emits unpolarized illumination light can be used as a matter of course.

Next, an operation of the projection system 20 according to the first embodiment of the present invention, having the above-described constitution, will be described. Explanation will be given by referring to the case wherein, in the projection system 20, the imaging light emitted from the liquid crystal projector 21a in the projector 21 contains a linearly polarized light beam in a wave range for a green color (G), having a specified axis of polarization, and linearly polarized light beams in wave ranges for a red color (R) and a blue color (B), respectively having axes of polarization perpendicular to the axis of polarization of the linearly polarized light beam in the wave range for a green color (G), and wherein the imaging light selectively reflected by the reflective polarization screen 23 is left-handed circularly polarized light beams in the wave ranges for the red color (R), the green color (G), and the blue color (B).

In the projection system 20 shown in FIG. 1, the imaging light emitted from the liquid crystal projector 21a in the projector 21 firstly passes through the quarter wave plate 22, and the respective linearly polarized light beams in the wave ranges for red (R), green (G), and blue (B), contained in the imaging light, are converted into circularly polarized light beams. At this time, the slow axis of the quarter wave plate 22 forms an angle of 45° with the axis of polarization of the linearly polarized light emitted from the liquid crystal projector 21a. Consequently, the linearly polarized light in the wave range for green (G) is converted into left-handed circularly polarized light, while the linearly polarized light beams in the wave ranges for red (R) and blue (B) are converted into right-handed circularly polarized ones.

Thereafter, the imaging light that has passed through the quarter wave plate 22 (the left-handed circularly polarized light beam in the wave range for green (G), and the right-handed circularly polarized light beams in the wave ranges for red (R) and blue (B)) enters the reflecting element 10 and is reflected from this element. It is herein supposed that the cholesteric reflective layer 11 in the reflecting element 10 reflects light in the wave range for green (G), and that the metallic reflective layer 12 in the reflecting element 10 reflects light in the whole visible light range covering the wave ranges for red (R) and blue (B).

In this case, of the imaging light incident on the reflecting element 10, the left-handed circularly polarized light in the wave range for green (G) is reflected from the cholesteric reflective layer 11 as it is. On the other hand, the right-handed circularly polarized light beams in the wave ranges for red (R) and blue (B) pass through the cholesteric reflective layer 11 without being reflected from this layer; and these light beams are converted into left-handed circularly polarized light beams by the metallic reflective layer 12 while reflected from this layer. Therefore, after being reflected from the reflecting element 10, all of the light beams in the wave ranges for red (R), green (G), and blue (B) are left-handed circularly polarized ones, and thus the state of polarization of the circularly polarized light is made uniform in all of the wave ranges.

The state of polarization of the imaging light (left-handed circularly polarized light) that has been made uniform in all of the wave ranges for red (R), green (G), and blue (B) is the same as that of the imaging light selectively reflected by the reflective polarization screen 23. The reflective polarization screen 23 can, therefore, reflect the imaging light more efficiently than external light such as interior illumination light in order to display a bright and sharp image.

Thus, according to the first embodiment of the present invention, the reflecting element 10 comprising the cholesteric reflective layer 11 that selectively reflects only circularly polarized light in a specified wave range and transmits circularly polarized light not in the specified wave range, and the metallic reflective layer 12 that reflects light in a wave range covering at least one wave range other than the specified wave range of the circularly polarized light reflected by the cholesteric reflective layer 11 is provided as a reflecting element for reflecting the imaging light emitted from the liquid crystal projector 21a in the projector 21 in order to project it onto the reflective polarization screen 23, whereby the circularly polarized light beams in both the specified wave range and the wave range other than the specified wave range are reflected from the cholesteric reflective layer 11 and from the metallic reflective layer 12. For this reason, it is possible to convert the state of polarization of the imaging light emitted from the liquid crystal projector 21a in the projector 21 into a state of polarization, light in which state of polarization can be selectively reflected by the reflective polarization screen 23, while scarcely reducing the brightness of the imaging light (the amount of light). The reflective polarization screen 23 can, therefore, reflect the imaging light more efficiently than external light such as interior illumination light in order to display an image with high contrast even under bright environmental light.

Furthermore, according to the first embodiment of the present invention, the cholesteric reflective layer 11 reflects the circularly polarized light while maintaining the state of polarization of the circularly polarized light, and the metallic reflective layer 12 reflects the circularly polarized light while reversing the state of polarization of the circularly polarized light, so that the state of polarization of the imaging light, after being reflected from the cholesteric reflective layer 11 and the metallic reflective layer 12 in the reflecting element 10, is uniform in all of the wave ranges. For this reason, even when a commercially available liquid crystal projector (a liquid crystal projector of three plate type that emits a linearly polarized light beam in the wave range for green (G), having a specified axis of polarization, and linearly polarized light beams in the wave ranges for red (R) and blue (B), respectively having axes of polarization perpendicular to the axis of polarization of the linearly polarized light beam in the wave range for green (G)) is used as the liquid crystal projector 21a in the projector 21, and a conventional reflective polarization screen that reflects imaging light in one state of polarization irrespective of the wave range of the light is used as the reflective polarization screen 23, it is possible to correctly project an image on the reflective polarization screen 23.

Figure 3:
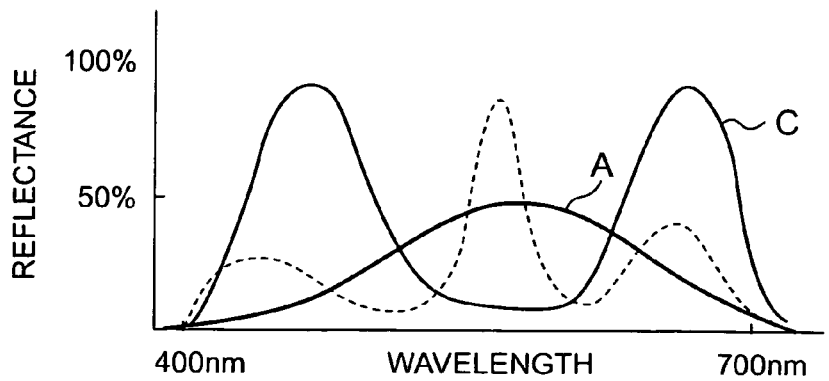
FIG. 3 is a diagram showing another example of reflection characteristics of the reflecting element used in the projection system shown in FIG. 1.

Although the metallic reflective layer 12 is used, in the aforementioned first embodiment, as the second reflective layer on the back side, any other layer can be used as long as it is a layer of the above-described polarization-reversing type and can reflect light in a wave range covering at least one wave range other than the specified wave range of the light reflected by the cholesteric reflective layer 11 as the first reflective layer. Specifically, it is possible to use a Bragg reflective layer made of a dielectric multi-layer film that can be obtained by laminating thin films with different refractive indexes, for example. Any Bragg reflective layer, such as a commercially available interference filter, band-pass filter, or dichroic mirror, can be used herein as long as it is based on the principle of Bragg reflection. In this case, although the Bragg reflective layer may be designed in such a manner that it reflects light in the whole visible light range, as shown in FIG. 2 (see reference character B), it may also be designed in such a manner that it selectively reflects only light in wave range other than the wave range for green (G) (light in the wave ranges for red (R) and blue (B)), as shown in FIG. 3 (see reference character C), if the cholesteric reflective layer 11 is designed in such a manner that it selectively reflects only light in the wave range for green (G) (see reference character A).

Further, although the first embodiment has been described with reference to the case wherein the cholesteric reflective layer 11 selectively reflects only light in the wave range for green (G), this invention can also be applied to a case wherein the cholesteric reflective layer 11 selectively reflects only light in wave ranges other than the wave range for green (G) (e.g., light in the wave ranges for red (R) and blue (B)).

Figure 4:
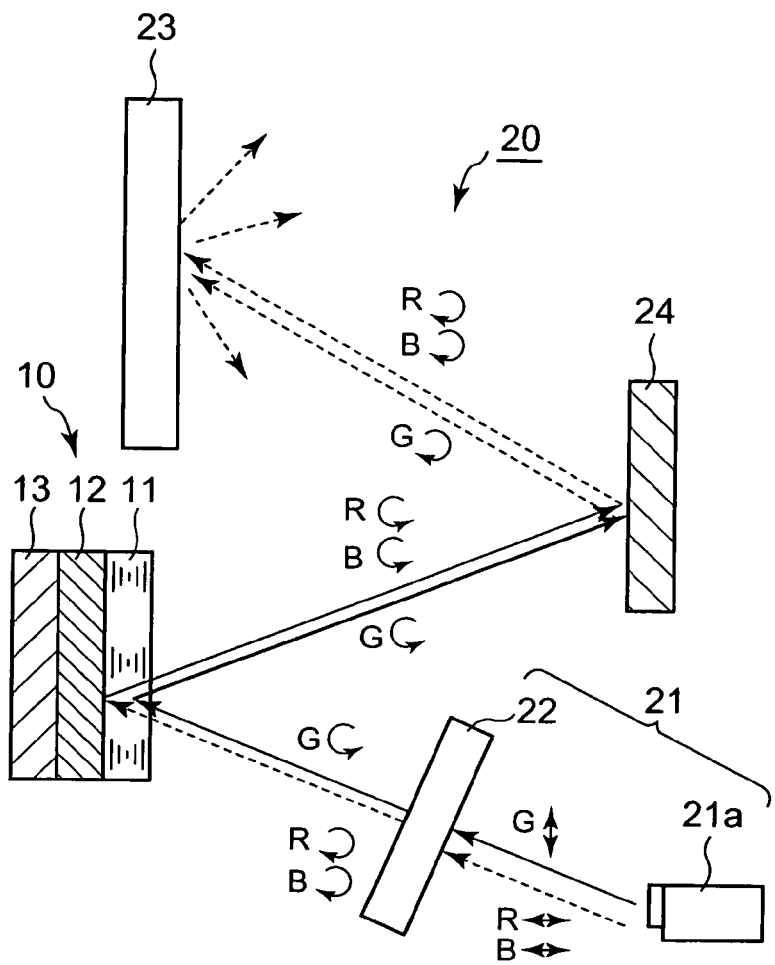
FIG. 4 is a view showing another example of the projection system shown in FIG. 1.

Furthermore, in the aforementioned first embodiment, the imaging light reflected from the reflecting element 10 is projected directly onto the reflective polarization screen 23. However, as shown in FIG. 4, a reflector 24 that reflects the imaging light beams in the wave ranges for red (R), green (G), and blue (B) may be placed on the optical path between the reflecting element 10 and the reflective polarization screen 23, thereby reflecting the imaging light, reflected from the reflecting element 10, to project it onto the reflective polarization screen 23. In this case, it is necessary that the state of polarization of the imaging light that has been reflected from the reflector 24 and is projected on the reflective polarization screen 23 be the same as that of the imaging light selectively reflected by the reflective polarization screen 23. For this reason, when a metallic or Bragg reflective layer that reflects the circularly polarized light reflected from the reflecting element 10, while reversing the state of polarization of the circularly polarized light, is used as the reflector 24, it is necessary to use, as the reflective polarization screen 23, a screen of a type that selectively reflects right-handed circularly polarized light beams in the wave ranges for red (R), green (G), and blue (B). On the other hand, when a cholesteric reflective layer that reflects the circularly polarized light reflected from the reflecting element 10, while maintaining the state of polarization of the circularly polarized light, is used as the reflector 24, it is possible to use a screen of a type that selectively reflects, like the above-described reflective polarization screen 23, left-handed circularly polarized light beams in the wave ranges for red (R), green (G), and blue (B). In the projection system 20 having the constitution shown in FIG. 1, since the imaging light is reflected only once from the reflecting element 10, the imaging light travels in a direction opposite to the direction in which the projector 21 emits the imaging light. The projector 21 and the reflective polarization screen 23 are, therefore, arranged in a positional relationship different from that in a conventional front projection system. On the other hand, in the projection system 20 having the constitution shown in FIG. 4, since the imaging light is reflected twice, that is, from the reflecting element 10 and from the reflector 24, the projector 21 and the reflective polarization screen 23 are arranged in the same positional relationship as that in a conventional front projection system.

Figure 5:
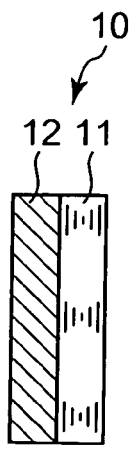
FIG. 5 is a sectional view showing another example of reflecting element for use in the projection system shown in FIG. 1.

Furthermore, although the cholesteric reflective layer 11 and the metallic reflective layer 12 are laminated onto the substrate 13 in the above-described first embodiment, the reflecting element 10 may also be composed only of the cholesteric reflective layer 11 and the metallic reflective layer 12 without the substrate 13, as shown in FIG. 5.

Figure 6:
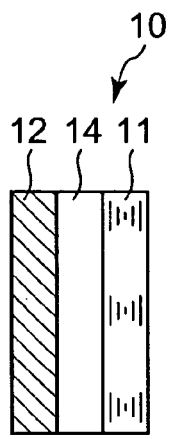
FIG. 6 is a sectional view showing a further example of reflecting element for use in the projection system shown in FIG. 1, FIGS. 7A and 7B are views illustrating the relationship between thickness of an intermediate layer contained in the reflecting element shown in FIG. 6 and optical path difference produced by the reflected light.

Furthermore, although the cholesteric reflective layer 11 and the metallic reflective layer 12 are laminated directly to each other in the above-described first embodiment, these two layers may also be laminated via an intermediate layer 14 such as a base material or a pressure-sensitive adhesive layer, as shown in FIG. 6.

It is herein preferred that the cholesteric reflective layer 11 and the metallic reflective layer 12 be situated basically close to each other. This is because, if an intermediate layer that is relatively thick is placed between the two layers (the cholesteric reflective layer 11 and the metallic reflective layer 12), there is a possibility that a great difference is produced between the optical path of the light reflected from the cholesteric reflective layer 11 and the optical path of the light reflected from the metallic reflective layer 12, as shown in FIG. 7B, which induces such a phenomenon that images in respective three primary colors, projected on the reflective polarization screen 23, are not perfectly superposed. It is, therefore, preferable to use, as the metallic reflective layer 12 in the reflecting element 10, a front surface mirror whose outermost surface is a reflective surface, and it is also preferred that the cholesteric reflective layer 11 be laminated directly to this reflective surface. Vacuum deposition, direct coating, transfer coating using no pressure-sensitive adhesive layer, or the like is preferably conducted to laminate the cholesteric reflective layer 11 directly onto the metallic reflective layer 12.

Figure 7A:
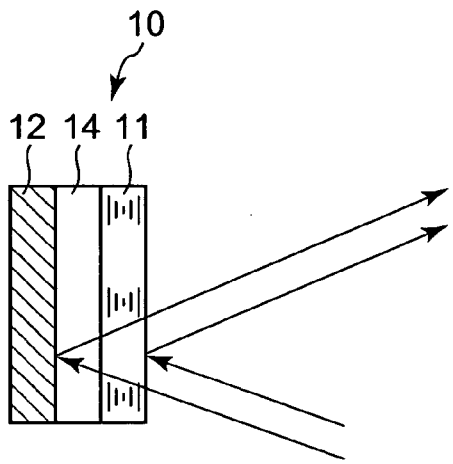
Figure 7B:
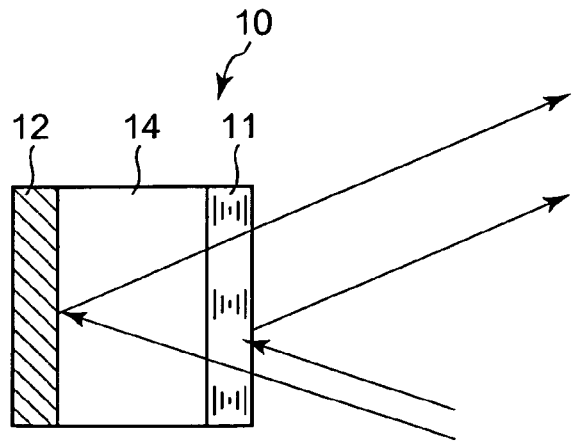

On the other hand, when the intermediate layer 14 to be placed between the cholesteric reflective layer 11 and the metallic reflective layer 12 is extremely thin, it scarcely affects the optical path difference, as shown in FIG. 7A. The desired intermediate layer 14 can, therefore, be placed as long as its thickness is 100 microns or less, preferably 50 microns or less, more preferably 5 microns or less. Specifically, a layer having the function of enhancing adhesion properties, a layer capable of imparting wettability that is required when a material is applied, or a layer serving as a protective layer, for example, may be used as the intermediate layer 14. In a case wherein the cholesteric reflective layer 11 is formed by applying cholesteric liquid crystals directly to the metallic reflective layer 12, it is preferable to use, as the intermediate layer 14, an alignment film for aligning a cholesteric liquid crystal polymer. Any of conventional alignment films generally used in liquid crystal displays, such as a polyimide or PVA (polyvinyl alcohol) film that has been subjected to rubbing treatment, or an optical alignment film that has been subjected to optical alignment treatment, can be used as the alignment film.

Furthermore, although the reflecting element 10 is provided separately from the projector 21 in the above-described first embodiment, the reflecting element 10 may also be integrally incorporated in the projector 21.

Figure 8:
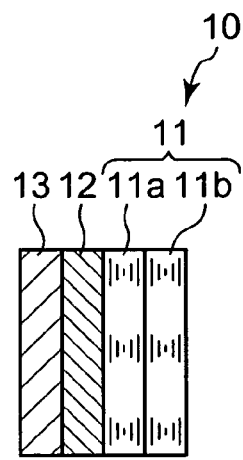
FIG. 8 is a sectional view showing a still further example of reflecting element for use in the projection system shown in FIG. 1.

Furthermore, although the cholesteric reflective layer 11 in the above-described first embodiment is composed of a cholesteric layer that reflects light in the desired wave range, this layer may also be composed of, for example, a plurality of cholesteric liquid crystal layers (a first cholesteric layer 11*a* and a second cholesteric layer 11*b*) that reflect light in different wave ranges, as shown in FIG. 8.

Second Embodiment

The second embodiment of the present invention will be described hereinafter with reference to FIGS. 10 and 11. The second embodiment of the invention is basically the same as the first embodiment shown in FIGS. 1 to 9, except that the reflecting element in the second embodiment is different from that in the first embodiment in lamination. Throughout FIGS. 1-9 and FIGS. 10-11, like reference characters designate identical parts, and the detailed description of these parts that has been given already will be not be repeated in the following description of the second embodiment.

In the reflecting element 10 in the projection system 20 of the first embodiment shown in FIGS. 1 to 9, the cholesteric reflective layer 11 as a polarization-maintaining reflective layer is provided as the first reflective layer on the incident side, and the metallic reflective layer 12 as a polarization-reversing reflective layer is provided as the second reflective layer on the back side. However, the requirement for the reflecting element 10 is merely that either the first or the second reflective layer is a polarization-maintaining one, while that the other reflective layer is a polarization-reversing one. The reflecting element 10 may, therefore, be composed of a polarization-reversing reflective layer provided as the first reflective layer on the incident side, and a polarization-maintaining reflective layer provided as the second reflective layer on the back side.

Specifically, for example, a Bragg reflective layer 12', a polarization-reversing reflective layer, that selectively reflects only light in specified wave ranges (e.g., light in the wave ranges for red (R) and blue (B)) and transmits light in the other wave ranges may be provided as the first reflective layer on the incident side, while a cholesteric reflective layer 11, a polarization-maintaining reflective layer, that reflects light in a wave range covering one wave range other than the specified wave ranges of the light reflected by the Bragg reflective layer 12' (e.g., light in the wave range for green (G)) may be provided as the second reflective layer on the back side.

An operation of the projection system 20 according to the second embodiment of the present invention, having the above-described constitution, will now be described below. Explanation will be given with reference to the case wherein, in the projection system 20, the imaging light emitted from the liquid crystal projector 21*a* in the projector 21 contains linearly polarized light beams in the wave ranges for red (R) and blue (B), respectively having specified axes of polarization, and a linearly polarized light beam in the wave range for green (G), having an axis of polarization perpendicular to the respective axes of polarization of the light beams in the wave ranges for red (R) and blue (B), and wherein the imaging light selectively reflected by the reflective polarization screen 23 is left-handed circularly polarized light beams in the wave ranges for red (R), green (G), and blue (B).

Figure 10:
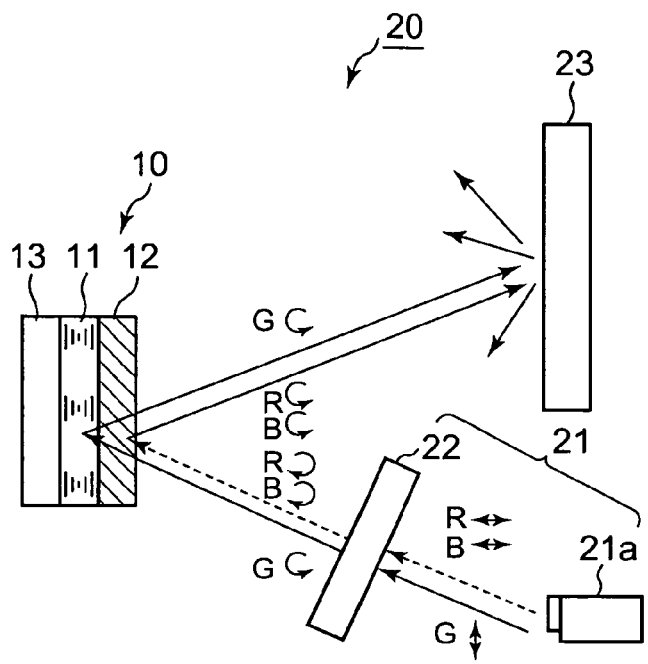
FIG. 10 is a view showing an example of projection system comprising a reflecting element according to the second embodiment of the present invention.

In the projection system 20 shown in FIG. 10, the imaging light emitted from the liquid crystal projector 21*a* in the projector 21 firstly passes through the quarter wave plate 22, whereby the respective linearly polarized light beams in the wave ranges for red (R), green (G), and blue (B), contained in the imaging light, are converted into circularly polarized ones. At this time, the slow axis of the quarter wave plate 22 forms an angle of 45° with the axis of polarization of the linearly polarized light emitted from the liquid crystal projector 21*a*. Consequently, the linearly polarized light beams in the wave ranges for red (R) and blue (B) are converted into right-handed circularly polarized light beams, and the linearly polarized light beam in the wave range for green (G) is converted into a left-handed circularly polarized light beam.

Thereafter, the imaging light that has passed through the quarter wave plate 22 (the right-handed circularly polarized light beams in the wave ranges for red (R) and blue (B), and the left-handed circularly polarized light beam in the wave range for green (G)) enters the reflecting element 10 and is reflected from this element. It is herein supposed that the Bragg reflective layer 12' in the reflecting element 10 reflects light beams in the wave ranges for red (R) and blue (B), while that the cholesteric reflective layer 11 in the reflecting element 10 reflects light in the wave range for green (G).

In this case, of the imaging light incident on the reflecting element 10, the right-handed circularly polarized light beams in the wave ranges for red (R) and blue (B) are converted into left-handed circularly polarized ones by the Bragg reflective layer 12' while reflected from this layer. On the other hand, the left-handed circularly polarized light beam in the wave range for green (G) passes through the Bragg reflective layer 12' without being reflected from this layer and then is reflected from the cholesteric reflective layer 11 as it is. Therefore, after being reflected from the reflecting element 10, all of the light beams in the wave ranges for red (R), green (G), and blue (B) are left-handed circularly polarized ones, and thus the state of polarization of the circularly polarized light is made uniform in all of the wave ranges.

The state of polarization of the imaging light (left-handed circularly polarized light) that has been made uniform in all of the wave ranges for red (R), green (G), and blue (B) is the same as that of the imaging light the reflective polarization screen 23 selectively reflects. The reflective polarization screen 23 can, therefore, reflect the imaging light more efficiently than external light such as interior illumination light in order to display a bright and sharp image.

Thus, according to the second embodiment of the present invention, the reflecting element 10 comprising the Bragg reflective layer 12' that selectively reflects only circularly polarized light in specified wave ranges and transmits circularly polarized light not in the specified wave ranges, and the cholesteric reflective layer 11 that reflects light in a wave range covering at least one wave range other than the specified wave ranges of the circularly polarized light beams reflected by the Bragg reflective layer 12' is provided as a reflecting element for reflecting the imaging light emitted from the liquid crystal projector 21a in the projector 21 in order to project it onto the reflective polarization screen 23, whereby the circularly polarized light beams in both the specified wave ranges and the wave range other than the specified wave ranges are reflected from the Bragg reflective layer 12' and from the cholesteric reflective layer 11. It is, therefore, possible to display an image with high contrast even under bright environmental light, like in the first embodiment described above.

Further, according to the second embodiment of the present invention, the Bragg reflective layer 12' reflects the circularly polarized light while reversing the state of polarization of the circularly polarized light, and the cholesteric reflective layer 11 reflects the circularly polarized light while maintaining the state of polarization of the circularly polarized light, so that the state of polarization of the imaging light, after being reflected from the Bragg reflective layer 12' and the cholesteric reflective layer 11 in the reflecting element 10, is uniform in all of the wave ranges. It is, therefore, possible to correctly project an image, like in the aforementioned first embodiment of the invention.

Figure 11:
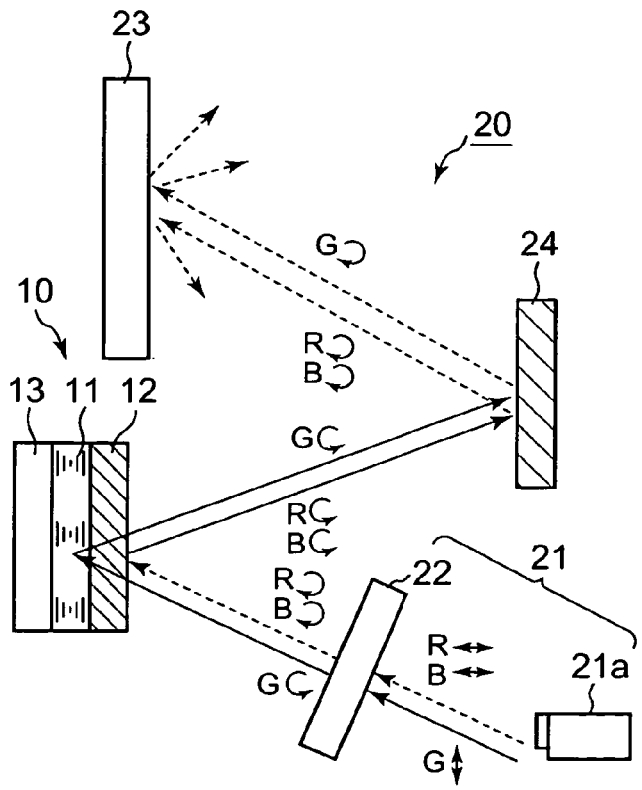
FIG. 11 is a view showing another example of projection system comprising a reflecting element according to the second embodiment of the present invention.

Although the imaging light reflected from the reflecting element 10 is projected directly onto the reflective polarization screen 23 in the above-described second embodiment, a reflector 24 that reflects the imaging light beams in the wave ranges for red (R), green (G), and blue (B) may be placed, as shown in FIG. 11, on the optical path between the reflecting element 10 and the reflective polarization screen 23, as in the aforementioned first embodiment, thereby reflecting the imaging light reflected from the reflecting element 10 to project it onto the reflective polarization screen 23.

Third Embodiment

The third embodiment of the present invention will be described with reference to FIGS. 12 and 13. The third embodiment of the invention is basically the same as the first embodiment shown in FIGS. 1 to 9, except that the reflecting element in the third embodiment is different from that in the first embodiment in lamination, that the projector in the third embodiment contains no quarter wave plate, and that the reflective polarization screen in the third embodiment is of a type that reflects linearly polarized light. Throughout FIGS. 1-9 and FIGS. 12-13, like reference characters designate identical parts, and the detailed description of these parts that has been given already will not be repeated in the following description of the third embodiment.

Figure 12:
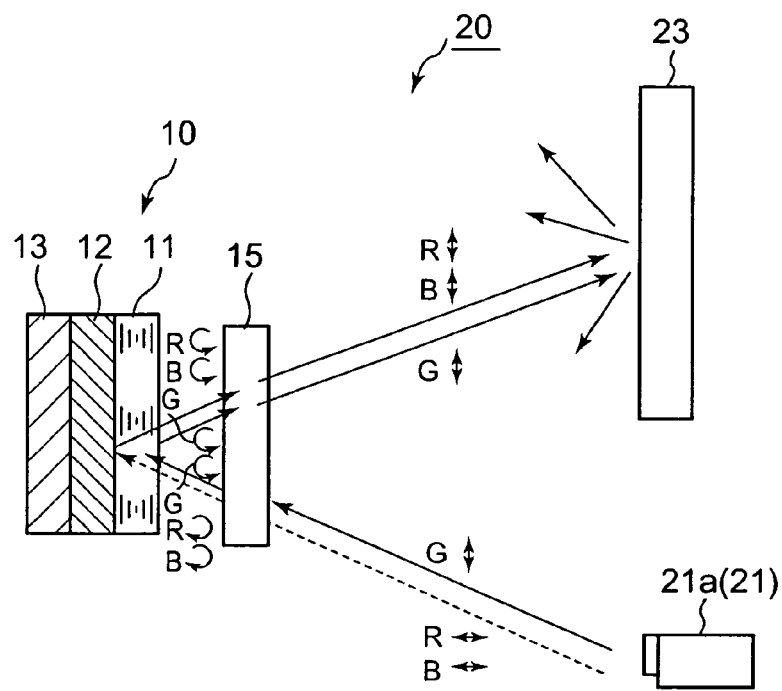
FIG. 12 is a view showing an example of projection system comprising a reflecting element according to the third embodiment of the present invention.
Figure 13:
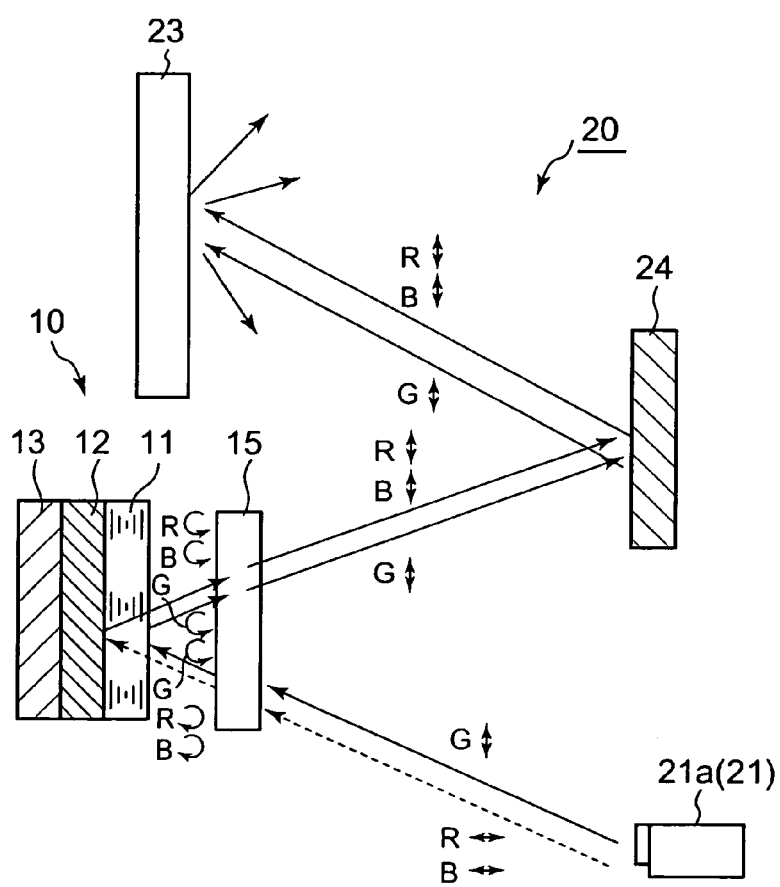
FIG. 13 is a view showing another example of projection system comprising a reflecting element according to the third embodiment of the present invention.

As shown in FIG. 12, in a projection system 20 according to the third embodiment of the present invention, a projector 21 is composed only of a liquid crystal projector 21a and does not have such a quarter wave plate as is shown in FIG. 1. A reflecting element 10 comprises, in addition to a cholesteric reflective layer 11 and a metallic reflective layer 12 that are laminated to a substrate 12, a quarter wavelength retardation layer 15 that brings, to light incident on the cholesteric layer 11 situated on the incident side, a phase shift equal to a quarter of the wavelength of the light. A reflective polarization screen 23 is of a type that selectively reflects linearly polarized light beams in the wave ranges for red (R), green (G), and blue (B).

The quarter wavelength retardation layer 15 contained in the reflecting element 10 has the same function as that of the quarter wave plate 22 shown in FIG. 1, and converts linearly polarized light contained in the imaging light emitted from the liquid crystal projector 21a (projector 21) into circularly polarized light. Like the quarter wave plate 22, the quarter wavelength retardation layer 15 is required to have each phase shift that matches each wavelength of the light beams in the respective wave ranges for the three primary colors (red (R), green (G), and blue (B)) making up the imaging light, so that it is preferable to form the quarter wavelength retardation layer as a wide-wave-range quarter wavelength retardation layer. A combination of a half wavelength retardation layer and a quarter wavelength retardation layer, a combination of materials having different refractive indexes, a material having characteristics suitable for a wide-wave-range quarter wavelength retardation layer, or the like may be used as the wide-wave-range quarter wavelength retardation layer. The wide-wave-range quarter wavelength retardation layer may be in the shape of a plate, a film, or the like. Specifically, a retardation layer for use in a circular polarizer can be used herein as it is, for example. In a case wherein a wide-wave-range quarter wavelength retardation layer is used as the quarter wavelength retardation layer 15, the elliptical electric vector of the circularly polarized light, converted from the linearly polarized light, becomes nearly perfectly circular, so that the conversion of the polarized light can be controlled by the reflecting element 10 with higher certainty.

Next, an operation of the projection system 20 according to the third embodiment of the present invention, having the above-described constitution, will be described below. Explanation will now be given by referring to the case wherein, in the projection system 20, the imaging light emitted from the liquid crystal projector 21a (the projector 21) contains a linearly polarized light beam in the wave range for green (G), having a specified axis of polarization, and linearly polarized light beams in the wave ranges for red (R) and blue (B), respectively having axes of polarization perpendicular to the axis of polarization of the linearly polarized light beam in the wave range for green (G), and wherein the imaging light the reflective polarization screen 23 selectively reflects is linearly polarized light beams in the wave ranges for red (R), green (G), and blue (B).

In the projection system 20 shown in FIG. 12, the imaging light emitted from the liquid crystal projector 21a (the projector 21) firstly passes through the quarter wavelength retardation layer 15 in the reflecting element 10, whereby the respective linearly polarized light beams in the wave ranges for red (R), green (G), and blue (B), contained in the imaging light, are converted into circularly polarized ones. At this time, the slow axis of the quarter wavelength retardation layer 15 in the reflecting element 10 forms an angle of 45° with the axis of polarization of the linearly polarized light emitted from the liquid crystal projector 21a (the projector 21). Consequently, the linearly polarized light beam in the wave range for green (G) is converted into a left-handed circularly polarized light beam, and the linearly polarized light beams in the wave ranges for red (R) and blue (B) are converted into right-handed circularly polarized ones.

Thereafter, the imaging light that has passed through the quarter wavelength retardation layer 15 in the reflecting element 10 (the left-handed circularly polarized light beam in the wave range for green (G), and the right-handed circularly polarized light beams in the wave ranges for red (R) and blue (B)) enters the cholesteric reflective layer 11 in the reflecting element 10 and is reflected from this layer 11 and also from the metallic reflective layer 12 situated behind the cholesteric reflective layer 11. It is herein supposed that the cholesteric reflective layer 11 in the reflecting element 10 reflects light in the wave range for green (G), while that the metallic reflective layer 12 in the reflecting element 10 reflects light beams in the wave ranges for red (R) and blue (B).

In this case, of the imaging light incident on the cholesteric reflective layer 11 in the reflecting element 10, the left-handed circularly polarized light in the wave range for green (G) is reflected from the cholesteric reflective layer 11 as it is. On the other hand, the right-handed circularly polarized light beams in the wave ranges for red (R) and blue (B) pass through the cholesteric reflective layer 11 without being reflected from this layer; and these light beams are converted into left-handed circularly polarized ones by the metallic reflective layer 12, while reflected from this layer. Therefore, after being reflected from the cholesteric reflective layer 11 and the metallic reflective layer 12 in the reflecting element 10, all of the light beams in the wave ranges for red (R), green (G), and blue (B) are left-handed circularly polarized ones. It is thus possible to make the state of polarization of the circularly polarized light, after being reflected from the cholesteric reflective layer 11 and the metallic reflective layer 12 in the reflecting element 10, uniform in all of the wave ranges.

The circularly polarized light reflected from the cholesteric reflective layer 11 and the metallic reflective layer 12 in the reflecting element 10 in the above-described manner passes again through the quarter wavelength retardation layer 15 in the reflecting element 10 while it is travelling toward the reflective polarization screen 23, and is converted into linearly polarized light. However, since the state of polarization of the circularly polarized light is uniform before the light passes through the quarter wavelength retardation layer 15, the state of polarization (the axis of polarization) of the linearly polarized light that has passed through the quarter wavelength retardation layer 15 is uniform as well.

The state of polarization of the imaging light (linearly polarized light) that has been made uniform in all of the wave ranges for red (R), green (G), and blue (B) is the same as that of imaging light (linearly polarized light) the reflective polarization screen 23 selectively reflects. Therefore, if the optical axis of the reflective polarization screen 23 and the axis of polarization of the linearly polarized light to be projected on the reflective polarization screen 23 have been made identical, the reflective polarization screen 23 can reflect the imaging light more efficiently than external light such as interior illumination light in order to display a bright and sharp image.

Thus, according to the third embodiment of the present invention, the reflecting element 10 comprising the quarter wavelength retardation layer 15 in addition to the cholesteric reflective layer 11 and the metallic reflective layer 12 is provided as a reflecting element for reflecting the imaging light emitted from the liquid crystal projector 21a (the projector 21) to project it onto the reflective polarization screen 23, whereby circularly polarized light beams in both the specified wave range and the wave ranges other than the specified wave range are reflected from the cholesteric reflective layer 11 and from the metallic reflective layer 12, and the state of polarization of the imaging light is converted, by the quarter wavelength retardation layer 15, from linearly polarized light into circularly polarized light, and vice versa. Therefore, although the projector 21 is not provided with a quarter wave plate, an image can be displayed with high contrast even under bright environmental light, as in the first embodiment described above.

Furthermore, according to the third embodiment of the present invention, the cholesteric reflective layer 11 reflects the circularly polarized light while maintaining the state of polarization of the circularly polarized light, and the metallic reflective layer 12 reflects the circularly polarized light while reversing the state of polarization of the circularly polarized light, so that the state of polarization of the imaging light, after being reflected from the cholesteric reflective layer 11 and the metallic reflective layer 12 in the reflecting element 10, is uniform in all of the wave ranges. It is, therefore, possible to correctly project an image, as in the aforementioned first embodiment.

Although the imaging light reflected from the reflecting element 10 is projected directly on the reflective polarization screen 23 in the aforementioned third embodiment, a reflector 24 that reflects imaging light beams in the wave ranges for red (R), green (G), and blue (B) may be placed on the optical path between the reflecting element 10 and the reflective polarization screen 23, thereby reflecting the imaging light reflected from the reflecting element 10 to project it onto the reflective polarization screen 23.

Figure 14:
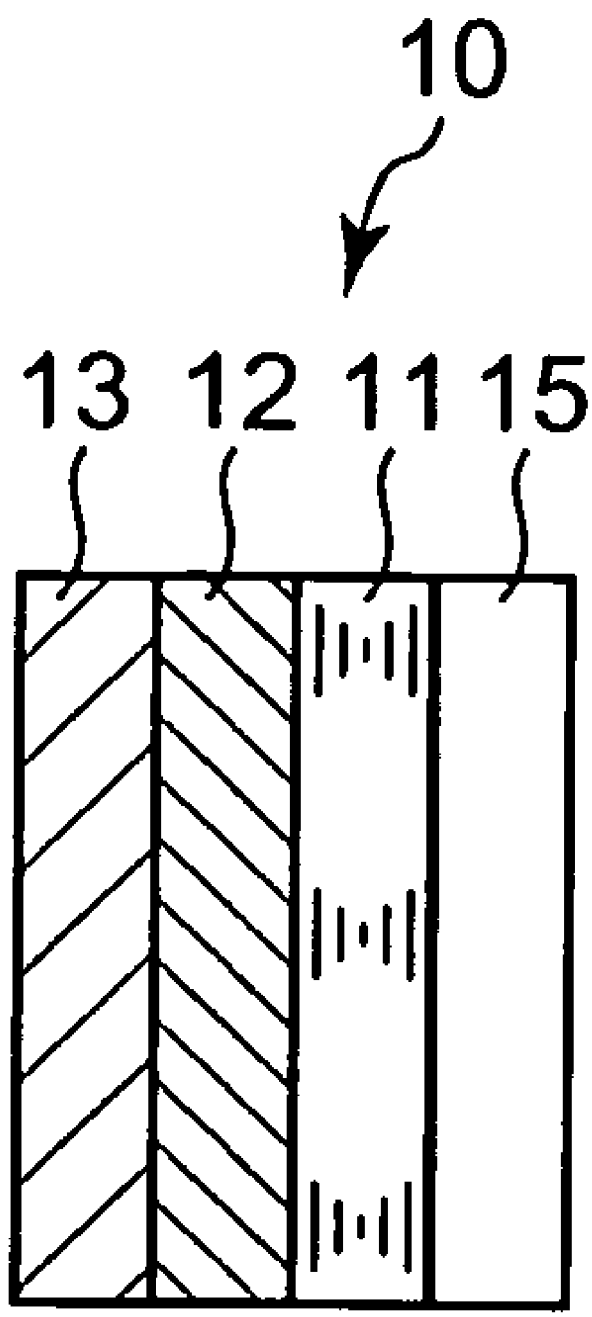
FIG. 14 is a sectional view showing another example of reflecting element for use in the projection systems shown in FIGS. 12 and 13, and FIGS. 15A and 15B are views illustrating the arrangement of constituent parts of the projection system according to Example of the present invention.

In addition, although the quarter wavelength retardation layer 15 is placed apart from the cholesteric reflective layer 11 in the reflecting element 10 in the above-described third embodiment, it may also be laminated close to the cholesteric reflective layer 11 in the reflecting element 10, as shown in FIG. 14.

EXAMPLES

A specific example of the aforementioned first embodiment of the present invention will be given below.

Example

A cholesteric reflective film (the cholesteric reflective layer) for selectively reflecting only light in a wave range for a green color was thermally transferred to an aluminum-surface-coated mirror (the metallic reflective layer) for lamination, thereby obtaining a reflecting element. Both the aluminum-surface-coated mirror and the cholesteric reflective film were formed as specular reflective layers capable of specularly reflecting light.

Used herein as the cholesteric reflective film was one having a thickness of 2.5 microns, formed on a PET substrate (an orientated PET film "T60" manufactured by Toray Industries Inc., Japan). A cholesteric liquid crystal polymer was used to form the cholesteric reflective film. The cholesteric reflective film had a reflection wave range of 520 to 560 nm and a reflectance of 90%.

The cholesteric reflective film thus formed on the PET substrate was laminated to the aluminum-surface-coated mirror, with the cholesteric reflective film in close contact with the reflective surface of the aluminum-surface-coated mirror; pressure was applied to the laminate at 150° C.; and the PET substrate was then peeled off, thereby transferring the cholesteric reflective film onto the aluminum-surface-coated mirror.

Figure 15A:
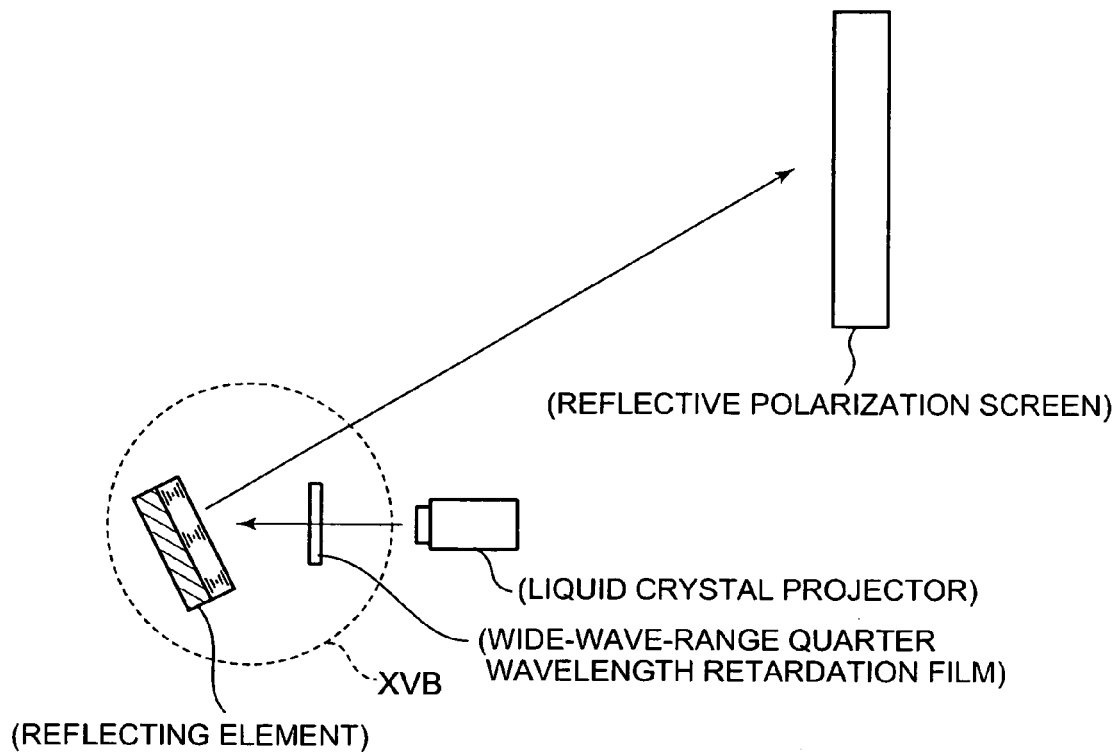

Thereafter, the reflecting element composed of the aluminum-surface-coated mirror and the cholesteric reflective film, produced in the above-described manner, was combined, as shown in FIG. 15A, with a liquid crystal projector (ELP-52 manufactured by Seiko Epson Corporation, Japan), a wide-wave-range quarter wavelength retardation film (manufactured by JSR Corporation, Japan), and a reflective polarization screen to assemble a projection system of Example. For the reflective polarization screen was used a screen using a circularly-polarized-light-separating layer of cholesteric liquid crystals. More specifically, a white-colored screen capable of selectively reflecting left-handed circularly polarized light beams in all of the wave ranges for the three primary colors (the wave range for red (R): 570-800 nm, that for green (G): 500-570 nm, and that for blue (B): 400 to 500 nm)

constituting imaging light was used as the reflective polarization screen. An ordinary fluorescent lamp was used as the source of illumination light.

Figure 15B:
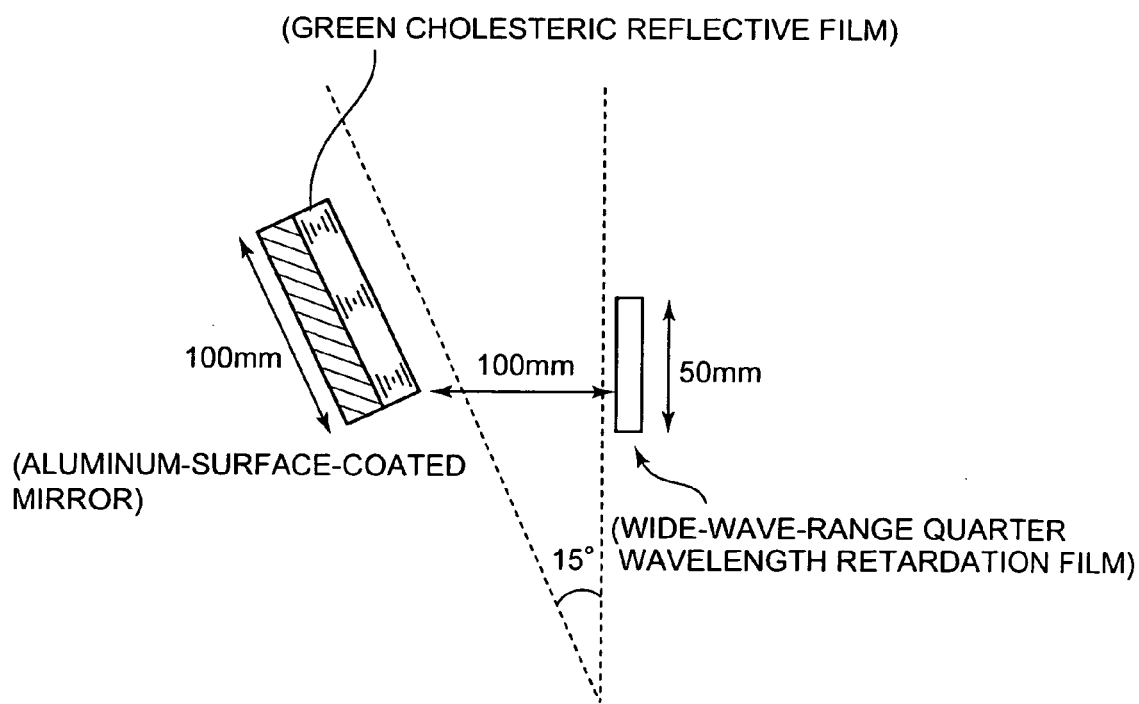

The wide-wave-range quarter wavelength retardation film that was fixed nearly perpendicular to the direction in which the imaging light was emitted from the liquid crystal projector, and the reflecting element composed of the aluminum-surface-coated mirror and the cholesteric reflective film were arranged as shown in FIG. 15B, with the cholesteric reflective film faced to the wide-wave-range quarter wavelength retardation film. Further, the reflecting element was tilted at an angle of 15° relative to the wide-wave-range quarter wavelength retardation film, and the reflecting element and the wide-wave-range quarter wavelength retardation film were arranged 100 mm apart from each other. The size (the diameter of the circular portion) of the reflecting element and that of the wide-wave-range quarter wavelength retardation film were made 100 mm and 50 mm, respectively.

Comparative Example

A polarization projection system without the reflecting element was prepared as a projection system of Comparative Example, in which the imaging light emitted from the liquid crystal projector was projected directly onto the reflective polarization screen through the wide-wave-range quarter wavelength retardation film.

(Results of Evaluation)

In the projection system of Example assembled in the above-described manner, the imaging light emitted from the liquid crystal projector was projected on the reflective polarization screen through the reflecting element. It was confirmed that the luminance of the imaging light projected thereon was approximately 1.7 times that of the imaging light projected on the reflective polarization screen in the projection system of Comparative Example having no reflecting element. It was also confirmed in a bright room illuminated by the fluorescent lamp that the image contrast obtained in the projection system of Example was 1.6 times higher than that obtained in the projection system of Comparative Example, and a bright and sharp image was thus viewed on the projection screen in the projection system of Example.

The invention claimed is:

1. A projection system comprising:
a projector that emits imaging light,
a polarization screen that selectively reflects, of the imaging light emitted from the projector, only light in a specified state of polarization to display an image, and
a reflecting element placed on an optical path between the projector and the polarization screen to reflect the imaging light, emitted from the projector and to project the same onto the polarization screen, the reflecting element comprising:
a first reflective layer that selectively reflects only light in a specified wave range and transmits light in other wave ranges, and
a second reflective layer that reflects light in another wave range covering at least one wave range other than the specified wave range of the light reflected by the first reflective layer,
wherein either the first or the second reflective layer is a polarization-maintaining reflective layer that reflects circularly polarized light while maintaining the state of polarization of the circularly polarized light, and
the other reflective layer is a polarization-reversing reflective layer that reflects circularly polarized light while reversing the state of polarization of the circularly polarized light,
wherein the projector emits imaging light containing circularly polarized light whose state of polarization varies according to the wave range of the light, and
the first and the second reflective layers in the reflecting element have polarization characteristics and reflection wave ranges corresponding to the state of polarization and the wave range of the circularly polarized light contained in the imaging light emitted from the projector in such a manner that the state of polarization of the circularly polarized light, after being reflected from the first and the second reflective layers, is uniform irrespective of the wave range of the light.

2. The projection system according to claim 1, wherein the projector comprises a projector body that emits imaging light containing linearly polarized light whose state of polarization varies according to the wave range of the light, and a quarter wave plate that is placed on an optical path between the projector body and the reflecting element to convert the linearly polarized light contained in the imaging light emitted from the projector body into circularly polarized light.

3. The projection system according to claim 2, wherein the projector body is a liquid crystal projector.

4. The projection system according to claim 1, wherein the reflecting element is integrally incorporated in the projector.

5. The projection system according to claim 1, further comprising a reflector placed on an optical path between the reflecting element and the polarization screen to reflect the imaging light reflected from the reflecting element and to project the same onto the polarization screen.

6. A projection system comprising:
a projector that emits imaging light,
a polarization screen that selectively reflects, of the imaging light emitted from the projector, only light in a specified state of polarization to display an image, and
a reflecting element placed on an optical path between the projector and the polarization screen to reflect the imaging light emitted from the projector and to project the same onto the polarization screen, the reflecting element comprising:
a first reflective layer that selectively reflects only light in a specified wave range and transmits light in other wave ranges,
a second reflective layer that reflects light in another wave range covering at least one wave range other than the specified wave range of the light reflected by the first reflective layer, and
a quarter wavelength retardation layer that brings, to light incident on the first reflective layer, a phase shift equal to a quarter of the wavelength of the light,
wherein either the first or the second reflective layer is a polarization-maintaining reflective layer that reflects circularly polarized light while maintaining the state of polarization of the circularly polarized light, and
the other reflective layer is a polarization-reversing reflective layer that reflects circularly polarized light while reversing the state of polarization of the circularly polarized light,
wherein the projector emits imaging light containing linearly polarized light whose state of polarization varies according to the wave range of the light,
the quarter wavelength retardation layer in the reflecting element converts the linearly polarized light contained in the imaging light into circularly polarized light, and the first and the second reflective layers in the reflecting element have polarization characteristics and reflection wave ranges corresponding to the state of polarization and the wave range of the circularly polarized light contained in the imaging light reflected by the reflecting element in such a manner that the state of polarization of the circularly polarized light, after being reflected from the first and the second reflective layers, is uniform irrespective of the wave range of the light.

7. The projection system according to claim 6, wherein the projector comprises a liquid crystal projector.

8. The projection system according to claim 6, wherein the reflecting element is integrally incorporated in the projector.

9. The projection system according to claim 6, further comprising a reflector placed on an optical path between the reflecting element and the polarization screen to reflect the imaging light reflected from the reflecting element and to project the same onto the polarization screen.

* * * * *